United States Patent
Takaki

(10) Patent No.: US 8,190,833 B2
(45) Date of Patent: May 29, 2012

(54) INFORMATION PROCESSING APPARATUS AND INFORMATION PROCESSING METHOD THAT SELECTS DATA TO BE DELETED WITHOUT A USER HAVING TO PERFORM A DELETE OPERATION

(75) Inventor: Yasuhito Takaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 584 days.

(21) Appl. No.: 12/273,385

(22) Filed: Nov. 18, 2008

(65) Prior Publication Data

US 2009/0164741 A1     Jun. 25, 2009

(30) Foreign Application Priority Data

Dec. 25, 2007 (JP) .................. 2007-332639

(51) Int. Cl.
*G06F 13/00* (2006.01)
(52) U.S. Cl. .................. 711/158; 711/162; 711/165
(58) Field of Classification Search ................. 711/158, 711/162, 165
See application file for complete search history.

(56) References Cited

U.S. PATENT DOCUMENTS

2001/0050875 A1 * 12/2001 Kahn et al. ................. 365/229
2003/0097532 A1 * 5/2003 Montgomery ............... 711/154

FOREIGN PATENT DOCUMENTS

| JP | 2001-100971 A | 4/2001 |
| JP | 2002-176576 A | 6/2002 |
| JP | 2007-074679 A | 3/2007 |

* cited by examiner

*Primary Examiner* — Reba I Elmore
(74) *Attorney, Agent, or Firm* — Canon USA Inc IP Division

(57) ABSTRACT

An information processing apparatus and an information processing method are capable of correctly selecting data to be deleted, without a user having to perform a troublesome operation. In a backup operation, a determination is made for each image file as to whether a predetermined condition is satisfied. If the condition is satisfied, image files are backed up, and storage priority levels defined for these image files are reduced in accordance with a rule predefined by a user. The storage priority level is a measure indicating the priority of keeping an image file in a storage unit. The higher the storage priority, the lower the probability that image files are deleted. The storage priority levels are changed depending on whether image files have been backed up and depending on the number of times image files were backed up.

9 Claims, 9 Drawing Sheets

INFORMATION PROCESSING APPARATUS AND INFORMATION PROCESSING METHOD THAT SELECTS DATA TO BE DELETED WITHOUT A USER HAVING TO PERFORM A DELETE OPERATION

BACKGROUND OF THE INVENTION

1. Field of the Invention

The present invention relates to an information processing apparatus, such as a digital camera, and an information processing method.

2. Description of the Related Art

In recent years, a great increase in the capacity of storage media for storing electronic data has been achieved, and the storage capacity is still rapidly increasing. Some new types of digital cameras have a large-capacity built-in storage medium that is not exchangeable. Such a type of digital camera is also called a medialess digital camera.

In a case where a user of a digital camera stores image data in a storage medium so that the image data can be played back whenever the user wants to do so, if the storage medium is of an exchangeable type, it is possible to store unlimitedly store image data by exchange the storage medium as required. However, in the case of medialess digital cameras, the storage medium disposed therein has an upper limit on the storage capacity no matter how large the storage capacity is, and thus it is necessary to delete some image data sooner or later.

The free space of a storage medium decreases to a low level if a large number of image data are stored therein. In such a situation, it is very troublesome to find, from a large number of image data, image data that is not necessary to be retained further and delete the found unnecessary image data.

Japanese Patent Laid-Open No. 2001-100971 discloses a technique to delete image data stored in a digital camera. In this technique, image data is deleted one by one taking into account information described in a print log. More specifically, storage priority information is added to image data on the basis of the print log, and deleting of image data is performed according to the storage priority information.

Although the technique disclosed in Japanese Patent Laid-Open No. 2001-100971 makes it easier to delete unnecessary image data from the storage medium, the technique has the following problems. First, when there is image data that a user wants to keep in the form of electronic data, there is a possibility that some or all of such image data that should be kept is deleted by mistake. Second, when a user wants to keep image data in a specific device, the desire of the user is not reflected in the storage priority information. That is, the desire of the user is not taken into account in the deletion of image data.

SUMMARY OF THE INVENTION

In view of the above, the present invention provides a technique to solve all or at least one of the problems described above.

The present invention provides an information processing apparatus including an acquisition unit configured to acquire electronic information, a storage unit configured to store the electronic information acquired by the acquisition unit, a transmission unit configured to transmit the electronic information stored in the storage unit to the outside, an addition unit configured to add priority, in terms of keeping the electronic information stored in the storage unit, to the electronic information stored in the storage unit, a change unit configured to change the priority depending on a result of the transmission performed by the transmission unit, and a deletion determination unit configured to determine electronic information to be deleted preferentially, in accordance with the priority.

Further features of the present invention will become apparent from the following description of exemplary embodiments with reference to the attached drawings.

DESCRIPTION OF THE EMBODIMENTS

Embodiments of the present invention are described below with reference to the accompanying drawings.

Figure 1:
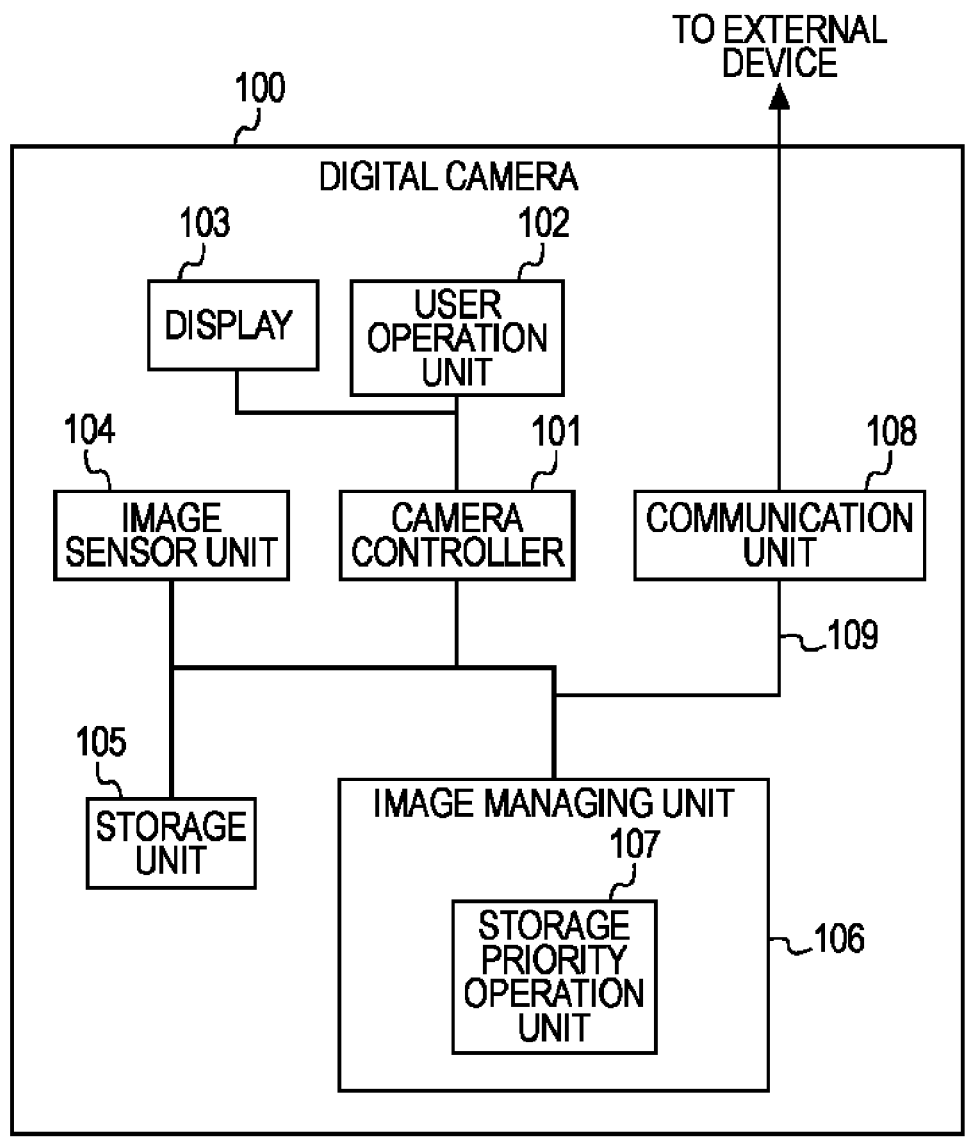
FIG. 1 is a block diagram illustrating a functional configuration of a digital camera (an information processing apparatus) according to an embodiment of the present invention.

FIG. 1 is a block diagram illustrating a functional configuration of a digital camera (an information processing apparatus) according to an embodiment of the present invention.

As shown in FIG. 1, the digital camera 100 includes a camera controller 101 and a user operation unit 102. The camera controller 101 receives information as to operations performed by a user from the user operation unit 102 and controls various processes such as an image capturing process, an image information writing process, an image information reading process, etc. More specifically, for example, when a notification of starting of a release operation is received from the user operation unit 102, the camera controller 101 performs the image capturing process. The user operation unit 102 accepts various operations such as pressing of a button performed by a user, and requests the camera controller 101 to control the camera operation according to the operation performed by the user.

The digital camera 100 further includes a display 103, an image capturing unit 104, and a storage unit 105. In accordance with a request from the camera controller 101, the display 103 displays various kinds of information for a user. The image capturing unit 104 functions as an acquisition unit configured to convert an optical image into digital information under the control of the camera controller 101 and transfer the obtained image data to the storage unit 105. The storage unit 105 is configured to store the image data produced by the image capturing unit 104 in the form of a file (electronic information) in a storage area of a flash memory or the like. In the present embodiment, a storage medium that provides the storage area is unremovable and has a fixed storage capacity.

The digital camera 100 also includes an image managing unit 106 having a storage priority operation unit 107. The storage priority operation unit 107 operates to specify the storage priority that is a measure of the priority in terms of keeping image files in the storage unit 105. In the present embodiment, for example, the storage priority levels are expressed by integers such that greater values indicate higher priority. The image managing unit 106 manages images in accordance with the storage priority. More specifically, for example, the image managing unit 106 selects an image file to be deleted and selects an image file to be backed up.

The digital camera 100 also includes a communication unit 108 configured to communicate with an external backup device (transmission target device) and transmit/receive image data to/from the external backup device.

The parts 101 to 108 described above are connected to each other via an internal bus 109 so that signals and image files can be transmitted among the parts 101 to 108 via the internal bus 109.

Figure 2:
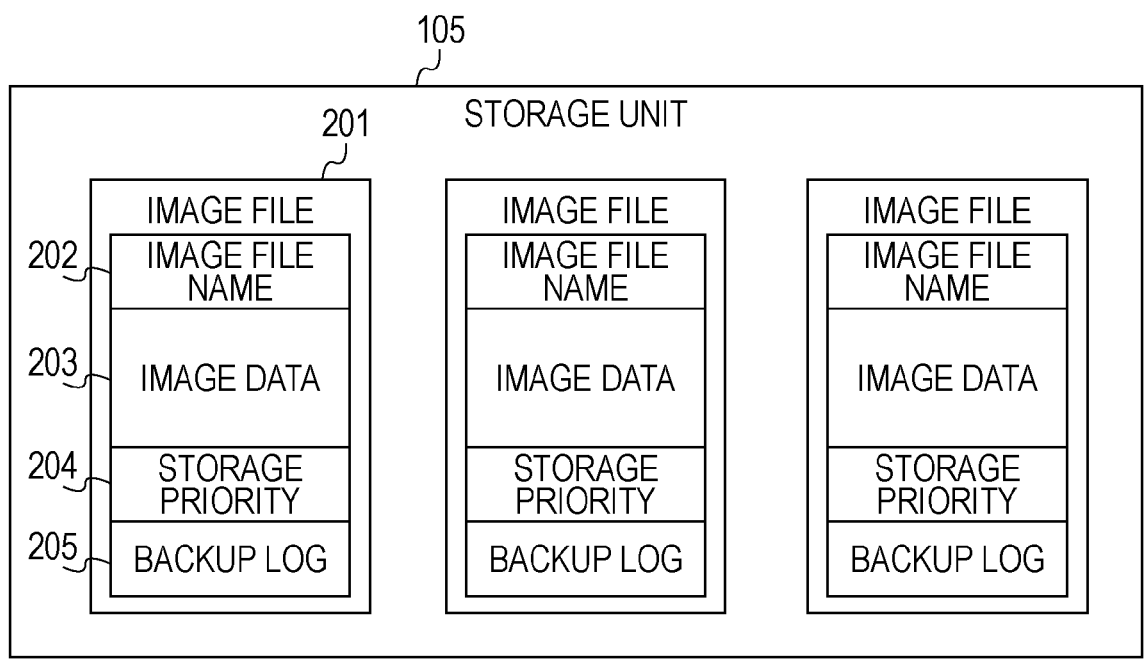
FIG. 2 is a diagram illustrating a structure of data stored in a storage unit.

Next, the structure of data stored in the storage unit 105 is described below. FIG. 2 is a diagram illustrating the structure of data stored in the storage unit 105.

As shown in FIG. 2, one image file 201 is assigned to one image data 203 produced by the image capturing unit 104. The image file 201 also includes an image file name 202, a storage priority level 204, and a backup log 205.

The image file name 202 is a name uniquely assigned to each piece of image data 203 produced by the image capturing unit 104 of the digital camera 100 in responses to an image capture operation performed by a user.

The storage priority 204 is, as described above, the measure of the priority in terms of keeping the image file 201 in the storage unit 105. The higher the storage priority 204 of the image file 201, the lower the probability of being deleted. When the image file 201 is produced, an initial value of the storage priority level thereof is assigned by the image managing unit 106. The initial value of the storage priority level may be set to, for example, 4, although the initial value is not limited to 4. Alternatively, the initial value may be set by a user. The storage priority level 204 changes mainly depending on whether backup has been performed and depending on the number of times the backup was performed, as will be described in further detail below. A description will also be given below as to how the storage priority level 204 is used.

The backup log 205 represents various kinds of information associated with the storing of the backup data of the image file 201 in an external backup device such as a personal computer. More specifically, for example, the backup log 205 includes information indicating a backup data storing date/time, information (ID) identifying an external backup device in which the backup data is stored, and a folder path where the backup data is stored. The backup log 205 is described in further detail below.

Figure 3:
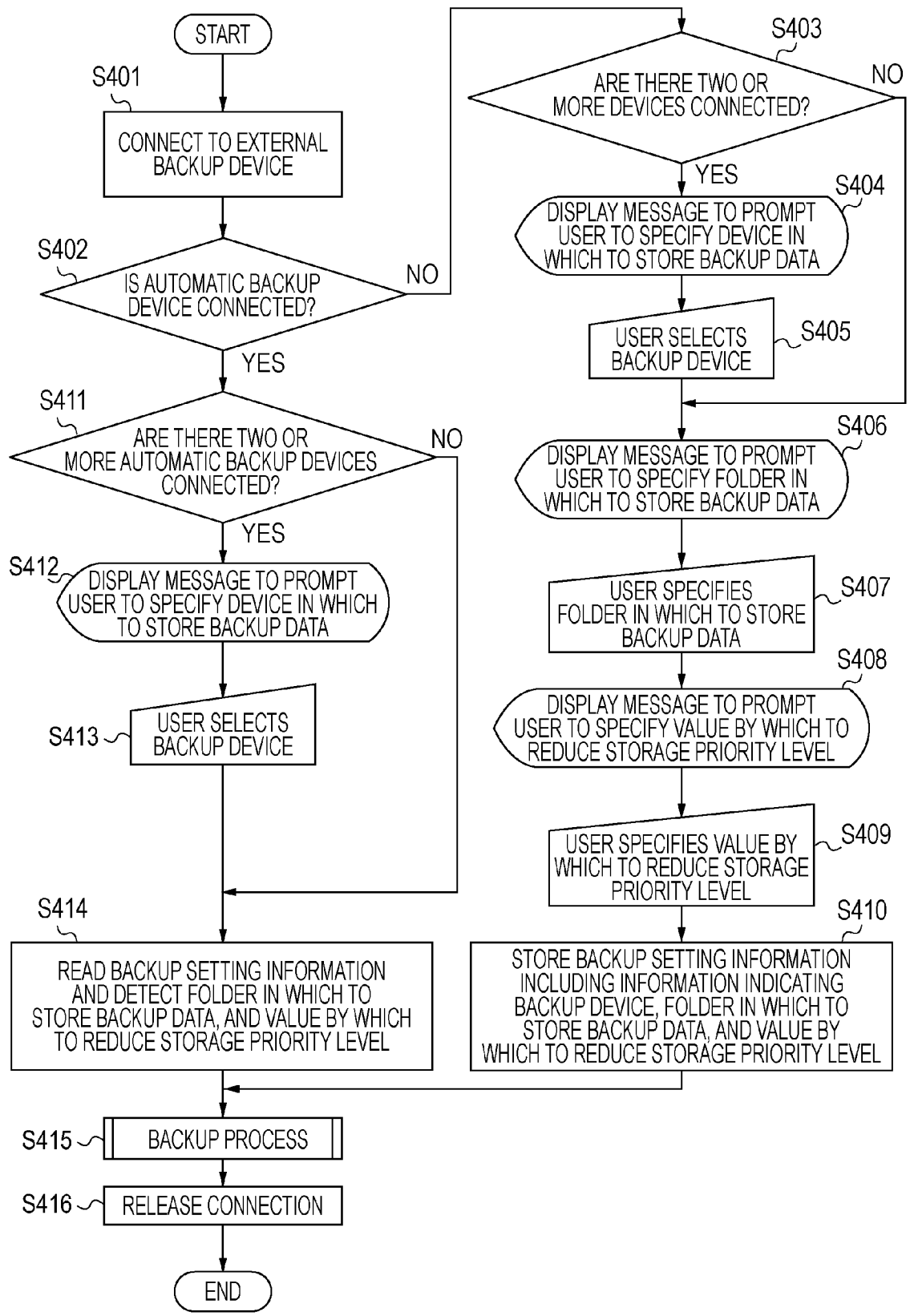
FIG. 3 is a flow chart illustrating a backup operation performed under the control of a digital camera.

An operation of storing an image file in an external backup device is explained below for a case where the operation is performed under the primary control of the digital camera 100. FIG. 3 is a flow chart illustrating a backup operation performed under the control of the digital camera.

First, in step S401, if the digital camera 100 is connected by a user to an external backup device, the camera controller 101 starts communication with the external backup device. The connection between the digital camera 100 and the external backup device may be realized by a wireless or wired connection.

Next, in step S402, the camera controller 101 determines whether the external backup device connected to the digital camera 100 is a device specified as an automatic backup device. The automatic backup device refers to an external backup device having an experience of being connected to the digital camera 100 and specified as an "automatic backup device" via the user operation unit 102. If the camera controller 101 determines that the digital camera 100 is connected to an automatic backup device, the processing flow proceeds to step S411, but otherwise the processing flow proceeds to step S403.

In step S403, the camera controller 101 determines whether a plurality of external backup devices are connected to the digital camera 100. If it is determined that a plurality of external backup devices are connected, the processing flow proceeds to step S404, but otherwise the processing flow proceeds to step S406.

In step S404, the display 103 displays a dialog to prompt a user to specify one of the plurality of external backup devices as a device to which the backup data is to be stored. In response, the user selects one of the external backup devices via the user operation unit 102 (step S405). The process then proceeds to step S406.

In step S406, the display 103 displays a dialog to prompt the user to specify a folder in which the backup data is to be stored. In response, the user specifies a folder in which the backup data is to be stored, via the user operation unit 102 (step S407).

Next, in step S408, the display 103 displays a dialog to prompt the user to specify a reduction value by which to reduce the storage priority level for the image data to be subjected to the backup process. In accordance with a value specified by the user via the user operation unit 102, the camera controller 101 sets the reduction value by which to reduce the storage priority level (step S409). That is, the camera controller 101 operates as a change value determination unit to set the reduction value, as a predetermined condition, indicating the reduction value by which to reduce the storage priority level.

Subsequently, in step S410, the camera controller 101 stores backup setting data including a combination of information input by the user in steps S405, S407, and S409, in the storage unit 105. More specifically, the backup setting data includes the information indicating the external backup device, the information indicating the folder in which to back up the image data, and the information indicating the reduction value by which to reduce the storage priority level. The backup setting data may further include information such as a password used in authentication of the user of the external backup device. The process then proceeds to step S415. The user may refer to the backup setting data and may set the external backup device as an automatic backup device. As described above, device information associated with each device to which data is transmitted, and information indicating the manner of changing the priority defined for each device or each device type are stored in advance. When the backup process or the image data transmission process is performed, the information is referred to, and the storage priority is updated depending on the device to which the image data is transmitted. Note that there is no restriction on the timing of setting the external backup device. For example, when the backup setting data is produced, a user may be asked to decide whether the external backup device is set as an automatic backup device. Alternatively, after a sequence of processes is completed, a user may perform the setting by operating the user operation unit 102.

In step S411, the camera controller 101 determines whether a plurality of automatic backup devices are connected to the digital camera 100. If it is determined that a plurality of automatic backup devices are connected to the digital camera 100, the process proceeds to step S412, but otherwise the process proceeds to step S414.

In step S412, the display 103 displays a dialog to prompt the user to specify one of the plurality of automatic backup devices to which the backup data is to be stored. In response, the user selects one of the automatic backup devices via the user operation unit 102 (step S413). The process then proceeds to step S414.

In step S414, the camera controller 101 reads the backup setting data including the information associated with the automatic backup device specified in step S413 from the storage unit 105. The process then proceeds to step S415.

In step S415, the camera controller 101 performs a backup process on the image file via the communication unit 108. The backup process is performed according to the information set in steps S407 and S409 or the information read in step S414, as will be described in further detail below.

Thereafter, in step S416, the camera controller 101 releases the connection with the external backup device (automatic backup device).

Figure 4:
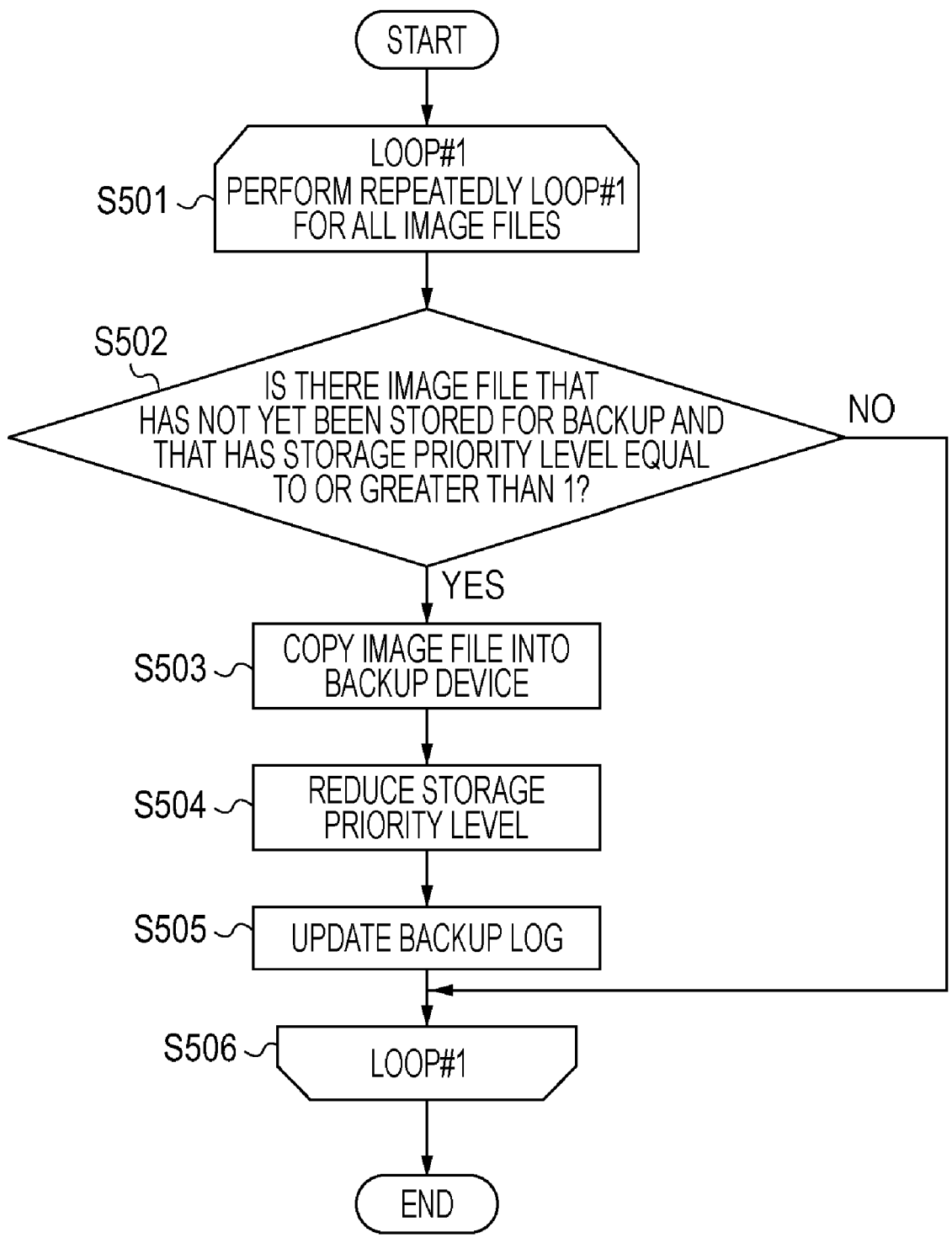
FIG. 4 is a flow chart illustrating details of a backup operation.

Next, details of the backup process in step S415 are explained below. FIG. 4 is a flow chart illustrating the details of the backup process in step S415.

In the backup processes (S501 to S506), steps S502 to S505 described below are performed repeatedly on each image file until all image files have been processed.

In step S502, the camera controller 101 determines whether the following two conditions are satisfied:
(1st Condition) Whether the image file of interest has not yet been backed up in the external backup device (or the automatic backup device) of interest; and
(2nd Condition) Whether the storage priority level is equal to or greater than 1.

The determination as to whether the first condition is satisfied or not can be made by checking the backup log 205 associated with the image file 201. The determination as to whether the second condition is satisfied or not can be made by checking the storage priority level 204 assigned to the image file 201. If the camera controller 101, operating as a transmission determination unit, determines that the two conditions are satisfied, the process proceeds to step S503. However, in a case where at least one of the two conditions is not satisfied, the camera controller 101 makes the determination in step S502 for a next image file (step S506).

In step S503, the camera controller 101 copies the image file into the external backup device via the communication unit 108.

Thereafter, in step S504, the storage priority operation unit 107 subtracts the value indicated by the reduction value of storage priority included in the backup setting data from the storage priority level 204 and stores the result in the storage unit 105. That is, the storage priority operation unit 107 operates as a change unit to change the storage priority level 204 in accordance with a result of the communication performed via the communication unit 108.

Subsequently, in step S505, the image managing unit 106 updates the backup log 205 and stores the updated backup log 205 in the storage unit 105.

Thereafter, the camera controller 101 makes the determination in step S502 after step S506 for a next image file.

Via the process described above, the image file 201 is backed up (copied) in the external backup device. As a result of the backup process, the storage priority level 204 changes, and the backup log 205 is updated. The storage priority level 204 is reduced each time the backup process is performed. That is, if the reduction value of storage priority is set to be constant, then the storage priority level 204 of each image file 201 simply decrease with increasing number of times the image file 201 is backed up. That is, the greater the number of times an image file 201 has been backed up in the external backup device, the lower the storage priority level 204. In other words, the greater the probability that a backup copy of an image file 201 can be found anywhere when the image file 201 is deleted from the digital camera 100, the lower the storage priority level 204 assigned to the image file 201.

When an external backup device connected to the digital camera 100 is recognized as an automatic backup device, an automatic backup process is performed without having to produce backup setting data. That is, it is possible for a user to perform the automatic backup process only by performing a very simple operation. Furthermore, it is possible to prevent the same image file 201 from being backed up a plurality of times in a single external backup device. It is also possible to prevent a further backup operation from being performed for image files having a low storage priority level 204 and thus having a high possibility that they have already been backed up in some external backup devices. That is, the determination based on the backup log 205 (step S502) makes it possible to prevent the image file 201 from being backed up a greater number of times than necessary.

Figure 5:
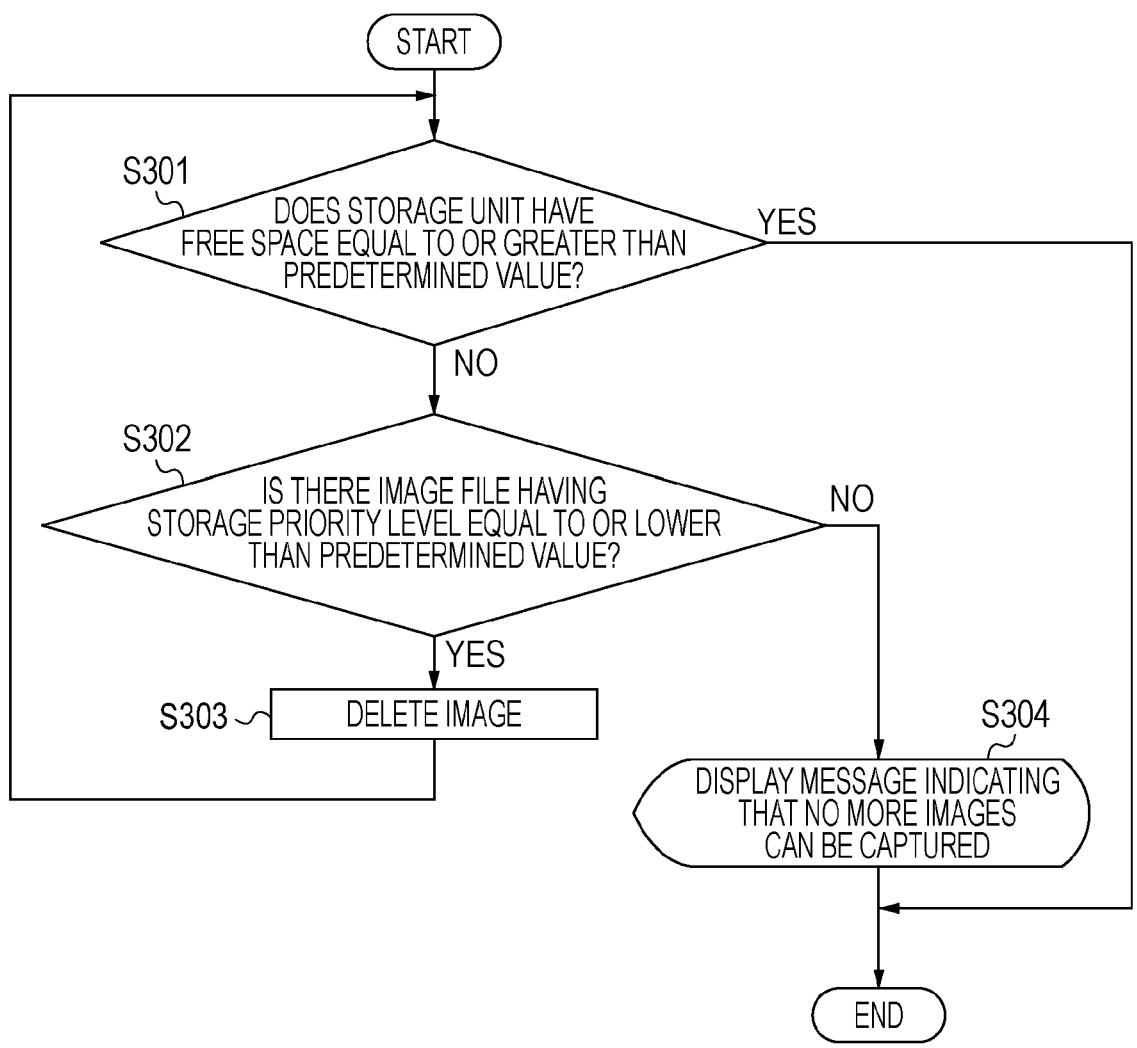
FIG. 5 is a flow chart illustrating an operation of deleting image files without a user having to select images.

Next, deleting of image files from the digital camera 100 is discussed below. In the present embodiment, a user is allowed to select image files and delete the selected image files in a similar manner to the conventional manner. In addition, it is also possible to delete image files without a user having to select image files. FIG. 5 is a flow chart illustrating an operation of deleting image files, which is performed without a user having to select image files.

First, in step S301, the camera controller 101 determines whether the storage unit 105 has a free storage space equal to or greater than a storage capacity threshold value. The storage capacity threshold value is set, for example, by a user. More specifically, for example, the user sets the storage capacity threshold value to be equal to or greater than the storage space necessary to store image files that will be produced during the image capturing operation that is going to be performed. If it is determined that the current free space is equal to or greater than the storage capacity threshold value, the file deleting process is ended without deleting any image file. In this case, the image capturing operation is performed using the image capturing unit 104, and a new image file produced as a result of the image capturing operation is stored in the storage unit 105. On the other hand, if it is determined that the current free space is smaller than the storage capacity threshold value, the processing flow proceeds to step S302.

In step S302, the camera controller 101 determines whether there is an image file 201 with a storage priority level 204 equal to or lower than a priority threshold value. The priority threshold value is also set by a user. The priority threshold value is set, for example, to "0". If an image file 201 is found that has a storage priority level 204 equal to or lower than the priority threshold value, the processing flow proceeds to step S303. However, if no image file 201 is found that has a storage priority level 204 equal to or lower than the priority threshold value, the processing flow proceeds to step S304.

In step S303, the camera controller 101 operates as a deletion determination unit to determine that the image file 201 detected in step S302 are preferentially deleted because their storage priority 204 is equal to or lower than the priority threshold value, and the camera controller 101 deletes the selected image file 201. In a case where there are a plurality of image files 201 with a storage priority level 204 equal to or lower than the priority threshold value, if the image files 201 have different values of the storage priority 204, the image files 201 are deleted in increasing order of the storage priority level 204. In a case where there are a plurality of image files 201 having the same storage priority level 204, the image files 201 are deleted in order from oldest to latest image capture date/time. Thereafter, the processing flow returns to step S301.

In step S304, the camera controller 101 notifies the user via the display 103 that no more image can be captured because there is no enough free storage space. Thereafter, the process is ended.

In the operation according to the present embodiment, image files 201 are deleted in increasing order of the storage priority level 204. That is, deleting is performed first for image files 201 that have already been backed up in one or more external backup devices and that have thus a low risk of having a problem when they are deleted from the digital camera 100. Therefore, it is possible to delete only image files 201 regarded as being probably unnecessary to be further kept while keeping image files 201 that have a high storage priority level 204 and are thus regarded as being necessary to be further kept in the storage unit 105.

By properly setting the storage priority, it becomes possible to selectively delete image files depending on weights indicating the intention of a user as to which device is used to keep image data.

A discussion is given below on a first example case in which it is assumed that a device A and a device B are used as backup devices, and a user manages image files using the device A. It is also assumed that, in the user's mind, image files that have already been backed up in the device A are allowed to be deleted from the digital camera 100, while images files that have already been backed up in the device B are allowed to be deleted when the free storage space of the storage unit 105 decreases to an unacceptably low level even, if they are not backed up in the device A. The storage priority levels are initially set to "4". In this first example case, for example, in step S409, the user may set the reduction value of storage priority to "4" for image files that have already been backed up in the device A and to "2" for image files that have already been backed up in the device B, and, in step S302, the user may set the threshold value to "2".

When the values are set in the above-described manner, if an image file is backed up in the device A, then the storage priority of this backed-up image file is changed to "0". On the other hand, if an image file is backed up in the device B, then the storage priority of this backed-up image file is changed to "2". The storage priority levels are maintained at "4" for image files that have not yet been backed up in either device. Therefore, if it is determined that the free storage space of the storage unit 105 has become lower than the threshold value (step S301), the image files backed up in the device A are preferentially deleted from the storage unit 105 (steps S302 to S303). In a case where the image files stored in the storage unit 105 include no image files that have already been backed up in the device A, image files that have been backed up in the device B are deleted from the storage unit 105 (steps S302 to S303). On the other hand, in a case where image files stored in the storage unit 105 have not been backed up in either the device A or the device B, any image file is not deleted, and a message is displayed to indicate that no more images can be captured (step S304).

Next, a discussion is given below on a second example case in which it is assumed that a device A and a device B are used as backup devices, and a user manages image files using both devices A and B. It is also assumed that, in the user's mind, only image files that have already been backed up in both devices A and B are allowed to be deleted from the digital camera 100. The storage priority levels are initially set to "4". In this second example case, for example, in step S409, the user may set the reduction value of storage priority to "2" for image files that have already been backed up in the device A and to "2" for image files that have already been backed up in the device B, and, in step S302, the user may set the threshold value to "0".

When the values are set in the above-described manner, if an image file is backed up only in the device A, then the storage priority of this backed-up image file is changed to "2". If an image file is backed up only in the device B, then the storage priority of this backed-up image file is changed to "2". The storage priority levels are maintained at "4" for image files that have not yet been backed up in either device. For image files that have been backed up in both device A and device B, the storage priority is set to "0". Therefore, if it is determined that the free storage space of the storage unit 105 has become lower than the threshold value (step S301), only the image files backed up in both the device A and the device B are deleted from the storage unit 105 (steps S302 to S303). On the other hand, in a case where image files stored in the storage unit 105 have not been backed up at least one of the device A and the device B, any image file is not deleted, and a message is displayed to indicate that no more images can be captured (step S304).

In the manner described above, it is possible to delete image files according to the intention of the user.

Figure 6:
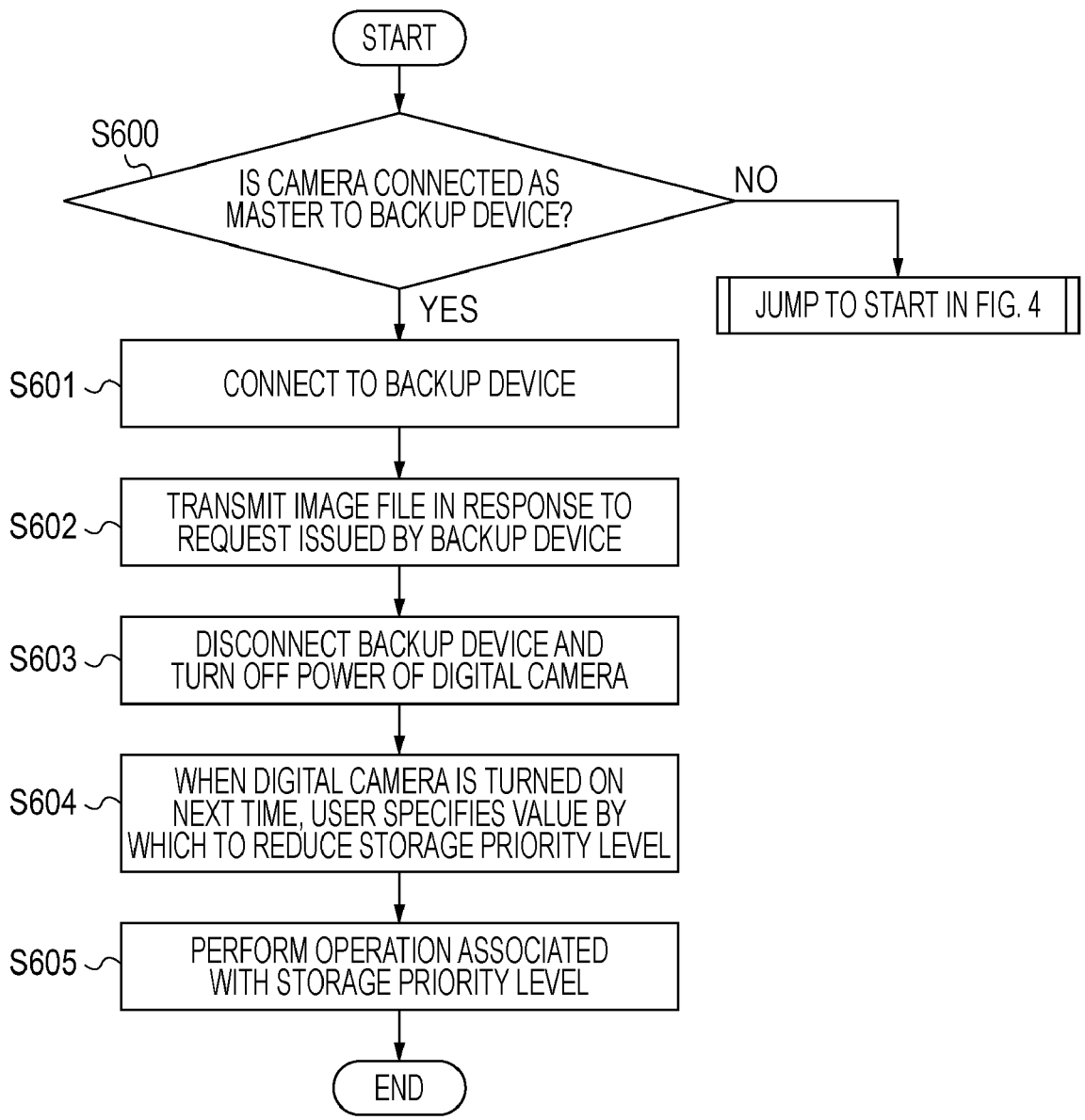
FIG. 6 is a flow chart illustrating a backup operation performed under the control of an external backup device.

In the backup operation, the digital camera 100 has a primary control, for example, in a situation in which the digital camera 100 is set as a master device and the external backup device is set as a slave device. In an opposite situation, the backup operation is performed under the control of the external backup device. The backup operation is explained in further detail below for the case where image files stored in the digital camera are backed up in the external backup device under the control of the external backup device. FIG. 6 is a flow chart illustrating the backup operation performed under the control of the external backup device.

First, in step S600, the camera controller 101 determines whether the digital camera 100 or the external backup device connected to the digital camera 100 is set as a master device. In the case where the digital camera 100 is set as a master device, the backup operation is performed according to the processing flow shown in FIG. 3. On the other hand, in the case where the external backup device is set as a master device, the processing flow proceeds to step S601.

In step S601, the camera controller 101 establishes a connection between the digital camera 100 and the external backup device. The camera controller 101 then starts a communication with the external backup device.

Next, in step S602, if the camera controller 101 receives a request from external backup device, the camera controller 101 transmits an image file 201 to the external backup device via the communication unit 108 in accordance with the request. The camera controller 101 stores information identifying the transmitted image file 201 in the storage unit 105.

In step S603, the camera controller 101 terminates the communication between the digital camera 100 and the external backup device, and the camera controller 101 turns off the electric power of the digital camera 100.

If the electric power of the digital camera 100 is again turned on thereafter and the digital camera 100 is activated, then, in step S604, the camera controller 101 prompts the user to specify the reduction value by which to reduce the storage priority level 204 of the image file 201 subjected to the immediately previous backup process. In response, the user specifies the reduction value by which to reduce the storage priority 204. That is, in this step S604, the camera controller 101 performs the process similar to steps S408 and S409 described above. Instead of specifying the value by the user, a fixed value may be set as the reduction value by which to reduce the storage priority 204. In a case where there is a backup setting data associated with the external backup device, the reduction value of storage priority described therein may be employed. In the case where the reduction value of storage priority is not specified by the user, it is desirable that the reduction value of storage priority be adjusted such that the reduction value of storage priority is smaller than that used in the case where the backup operation is performed under the primary control of the digital camera 100.

Next, in step S605, the storage priority operation unit 107 subtracts the value specified in step S604 from the storage priority 204 assigned to the image file 201 subjected to the immediately previous backup process, and the resultant new storage priority 204 is stored in the storage unit 105. The process is then ended.

As described above, in the case where the backup process is performed under the primary control of an external backup device, the timing of decreasing the storage priority 204 is adjusted such that the storage priority 204 is changed after the backup is completed for all image files of interest. That is, in the case where the backup process is performed under the primary control of the digital camera 100, the storage priority 204 is reduced each time one image file is backed up. In contrast, in the case where the backup process is performed under the primary control of an external backup device, the timing of decreasing the storage priority 204 is delayed. This is because the digital camera 100 cannot recognize whether the backup of each image file 201 is completed or not, although the digital camera 100 can recognize whether the transmission of each image file 201 to the external backup device is completed. More specifically, for example, even when the digital camera 100 is simply accessed by the external backup device, the digital camera 100 receives a request similar to the backup request. That is, reliability in the backup process under the control of the external backup device is lower than in the backup process under the control of the digital camera 100. To avoid a problem due to the above, the timing of changing the storage priority 204 is delayed.

Thus, as described above, even in the case where the backup process is performed under the primary control of the external backup device, it is possible to properly change the storage priority 204. In the case where the reduction value of storage priority is set by a user, it is desirable to adjust the reduction value of storage priority such that the reduction value of storage priority be smaller than in the case where the backup process is performed under the primary control of the digital camera 100, because, if the reduction value of storage priority is set to be equal to that used in the backup process under the primary control of the digital camera 100, the above-described low reliability in the backup process under the control of the external backup device can cause an image file to be deleted in an unpredictable manner.

Note that the storage priority 204 does not necessarily need to be described in the corresponding image file 201, but it may be stored separately from the image file 201 in other storage areas in the storage unit 105. Furthermore, in the present invention, the file type is not limited to the image file, but the invention may be applied to other data files such as an audio data file, a document data file, etc. The storage medium is not limited to that of the unremovable type, but a removable storage medium may be used.

The communication between the digital camera and an external device such as a personal computer or other types of storage devices may be performed via a wired communication medium such as a USB (Universal Serial Bus) bus or via a wireless communication medium. In the case of the wireless communication, the communication may be performed using a near field communication based on a communication protocol defined for use in communication in a short range of 1 m or several ten centimeters. As for communication protocols, non-contact communication protocols are known for use within a short range less than 70 cm and for use within a very short range less than 10 cm. These protocols are defined in standards ISO/IEC 15693, ISO/IEC 14434, ECMA-340 (ISO/IEC 18092) etc.

The present invention is very useful, in particular, when the control according to the first embodiment described above is applied to a system in which image data is automatically backed up using near field communication when a digital camera is brought to a location close to a storage device.

The near field communication is performed as follows.

Figure 10:
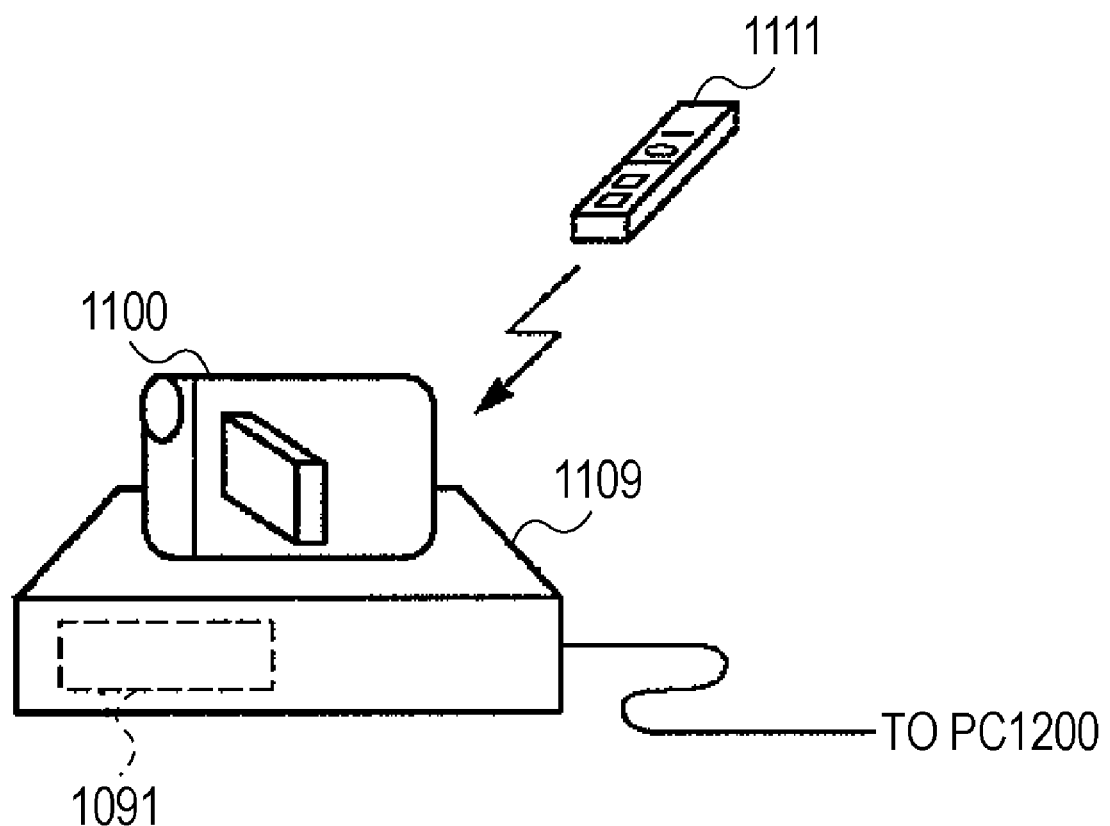
FIG. 10 is a diagram illustrating a backup system.

FIG. 10 is a diagram illustrating an example of a backup system using a near field communication. This backup system includes a camera 1100 having a near field communication capability, a remote controller 1111 for remotely controlling the camera 1100, and a storage device 1109 functioning as a cradle. The storage device 109 has a near field communication capability and includes a storage medium 1091 such as a hard disk drive. The storage device 109 is capable of storing image data received from the camera 1100 via the near field communication in the storage medium 1091. The storage device 1109 may be connected to a personal computer (PC) 1200 via a cable or the like so that the storage device 1109 is operable under the control of the PC 1200.

Figure 7:
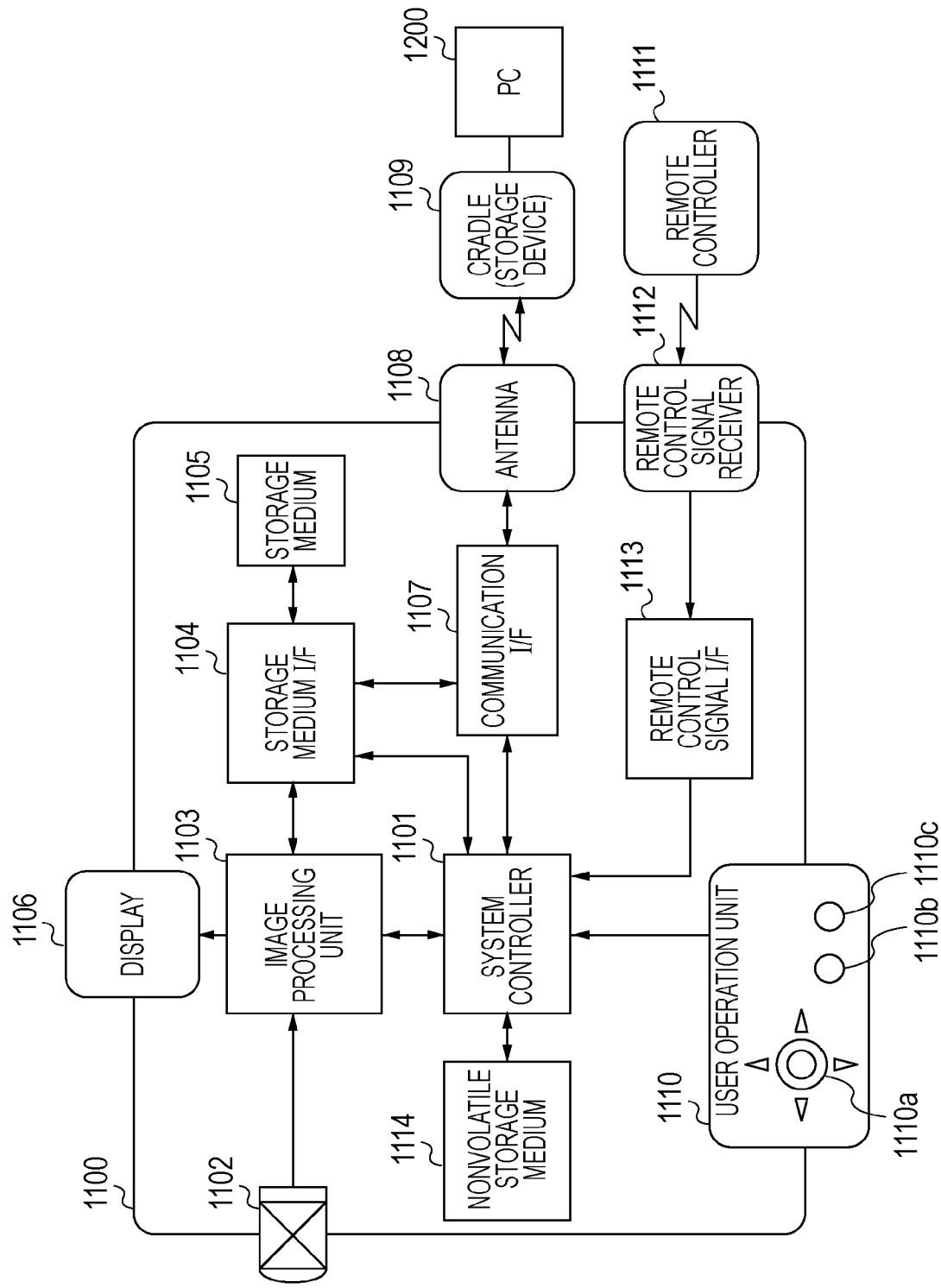
FIG. 7 is a block diagram illustrating an example of a configuration of a backup system.

FIG. 7 is a block diagram illustrating an example of a configuration of the backup system using the near field communication. The camera 1100 includes a system controller 1101 configured to control the operation of the whole camera, and also includes various functional blocks. The system controller 1101 includes a nonvolatile storage medium for storing a control program or the like, a CPU (Central Processing Unit) for executing the control program, and a RAM used as a work area by the CPU. An image capturing unit 1102 includes an optical system having an automatic focusing capability and a zooming capability, a control motor for controlling the optical system, and an image sensing device such as a CCD image sensor or a CMOS image sensor. The image capturing unit 1102 forms an optical image of a subject on an image sensing plane of the image sensing device. The optical image of the subject is converted by the image sensing device into an electrical signal of each pixel, and the electric signal is further converted by an image processing unit 1103 into digital data. The image processing unit 1103 produces image data file by performing image processing on the digital data in accordance with the setting of the camera. The image data file is stored in the storage medium 1105 such as a semiconductor memory via a storage medium interface 1104.

To play back the image data file stored in the storage medium 1105, the image processing unit 1103 performs a process on the image data file read from the storage medium 1105 to produce image data to be displayed. The resultant image data is displayed on a display 1106 under the control of the system controller 1101. In the configuration shown in FIG. 7, the storage medium 1105 is firmly disposed in the camera 1100. Alternatively, the storage medium 1105 may be implemented in a removable form using a memory card or the like.

The display 1106 is, for example, an LCD (Liquid Crystal Display) configured to display various GUIs (Graphical User Interfaces) such as a menu screen and an image read from the storage medium 1105. The display 1106 may also function as an electronic viewfinder by continuously displaying images sensed by the image capturing unit 1102.

A communication interface 1107 establishes and releases a communication channel of near field communication with an external device via an antenna 1108. After the communication channel is established, the communication interface 1107 transmits/receives data to/from the external device via the established communication channel.

A PC 1200 includes, as with the camera 1100, a CPU, a RAM, a storage medium, a communication interface, etc.

The camera 1100 may be controlled by a single piece of hardware or a plurality of pieces of hardware. In the case where a plurality of pieces of hardware are used, the plurality of pieces of hardware cooperate with each other to control the whole camera. This also applies to the control of the PC 1200.

In this system, the camera 1100 and the storage device 1109 are capable of communicating with each other. More specifically, it is possible to transmit image data stored in the storage medium 1105 of the camera 1100 to the storage device 1109 to store it therein, and it is also possible to transmit image data stored in the storage device 1109 to the camera 1100 to store it in the storage medium 1105.

A user operation unit 1110 is a unit used by a user to issue a command to the camera 1100. An operation performed by the user on the user operation unit 1110 is notified to the system controller 1101. The system controller 1101 controls various parts of the camera 1100 such that the camera 1100 operates according to the operation of the user operation unit 1110. In the present embodiment, the user operation unit 1110 includes an arrow-key pad also called a direction-key pad or a cursor-key pad 1110a, a set key also called an apply key or an execution key 1110b, and a menu key 1110c.

As described above, the camera 1100 is capable of being remote-controlled by the remote controller 1111. A signal (for example, an infrared signal) transmitted from the remote controller 1111 is received by a remote control signal receiver 1112 and supplied to the system controller 1101 via a remote control signal interface 1113. The system controller 1101 controls various parts of the camera 1100 so that the camera 1100 operates according to the operation of the remote controller 1111. The setting as to whether remote control signals (thereby to remote-control the camera 1100) are accepted or not may be performed by a user by performing a menu operation on the user operation unit 1110.

The remote controller 1111 includes operation keys corresponding to those disposed on the user operation unit 1110 of the camera 1100. The data indicating the setting as to whether the remote control is enabled or disabled is stored, for example, in the nonvolatile storage medium 1114. If the setting is changed, the data stored in the nonvolatile storage medium 1114 is updated.

Connection Detecting Process

Figure 8A:
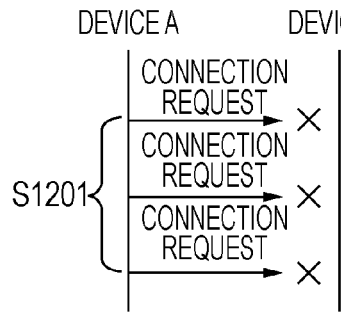
FIGS. 8A to 8C are sequence charts illustrating a process performed by a camera to detect a connection with a storage device according to an embodiment of the present invention.

Next, referring to sequence charts shown in FIGS. 8A to 8C, a connection detecting process performed by the camera 1100 to detect a connection with the storage device 1109 is explained below. A communication procedure shown in FIGS. 8A to 8C can also be applied to a case where the camera 1100 and the storage device 1109 operate oppositely such that image data stored in the storage device 1109 is transmitted to the digital camera 1100. In view of the above, in the sequence chart of the procedure of near field communication shown in FIGS. 8A to 8C, a general communication procedure is explained assuming that a connection request is issued by a device A, and a device B responds to the connection request.

To perform near field communication, it is necessary that the antenna of the device A and the antenna of the device B should be located within a predetermined small range (hereinafter, referred to simply as a communication range). When a connection request is issued by the device A, if the antenna of the device B is located outside the communication range as is the case in FIG. 8A, the device B cannot receive the connection request (S1201), and thus the device B returns no response to the connection request. In this case, connection is not established.

When the distance between the antennas of the devices A and B (hereinafter, an expression "the distance between the devices A and B" will also be used to describe the distance between the antennas of the devices A and B) is within the communication range, the connection establishment process is performed between the two devices.

Figure 8B:
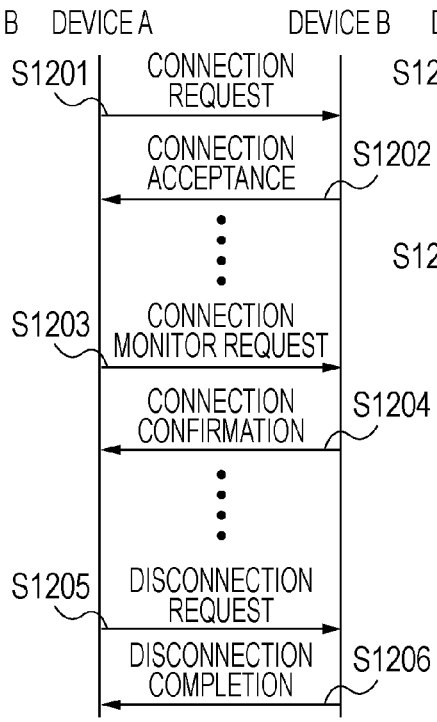

A connection establishment process is shown in FIG. 8B for a case where a connection request is issued from the device A to the device B in the system in which a connection between the devices A and B is established when the devices A and B come close to each other within the communication range, and the connection is maintained until the devices A and B go away out of the communication range.

When the connection request is issued by the device A (S1201), if a response is returned from the device B to accept the connection request (S1202), the connection is established. The connection between the device A and the device B is maintained as long as they are located within the communication range unless a disconnection request is transmitted from the device A (S1205) and a disconnection response is returned from the device B (S1206).

In this system, it is necessary to monitor the connection status by periodically transmitting a connection monitor request from the device A (S1203). If a connection confirmation response is returned from the device B (S1204) in response to the connection monitor request from the device A (S1203), the connection is in a connected status, but otherwise the connection is in a disconnected status. After the connection is established, if the distance between the device A and the device B increases beyond the upper limit of the communication range, no response is returned to the connection monitor request (S1203), and thus the device A performs a connection release process as a timeout handling process.

Figure 8C:
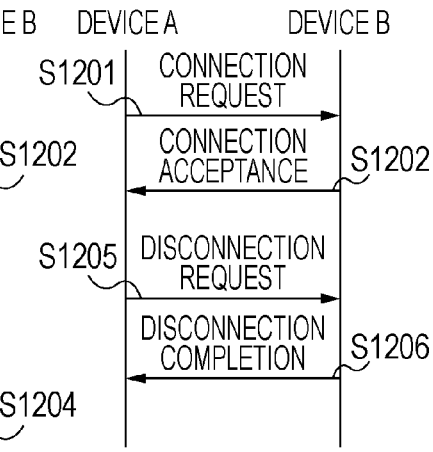

FIG. 8C shows a connection confirmation procedure between the device A and the device B in a system in which connection and disconnection are performed each time data is transmitted/received. The connection status can be confirmed by transmitting a connection request from the device A (S1201) and receiving a connection acceptance response from the device B (S1202). In the example shown in FIG. 8C, no data is transmitted/received, and thus, after the connection status is confirmed, a disconnection request is transmitted from the device A (S1205) and the connection is released.

In the example described above, the confirmation of the connection establishment between the device A and the device B is performed on the basis of confirmation on whether wireless communication is possible, the connection establishment may be confirmed on the basis of the communication radio wave strength or the status of a mechanical switch.

Data Communication Process

Figure 9A:
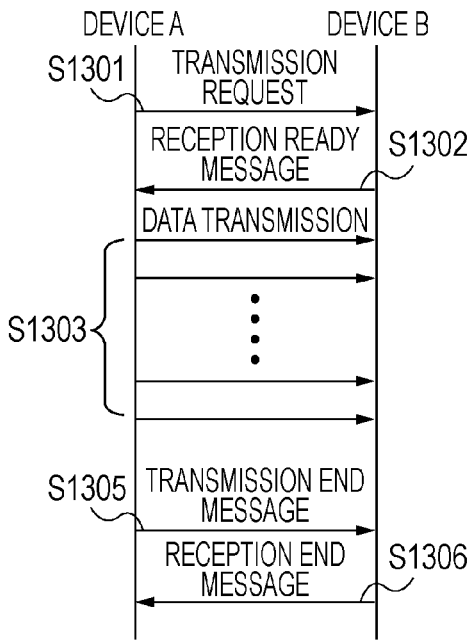
FIGS. 9A and 9B are a sequence charts illustrating a process as to data communication with a storage device, performed by a camera according to an embodiment of the present invention.
Figure 9B:
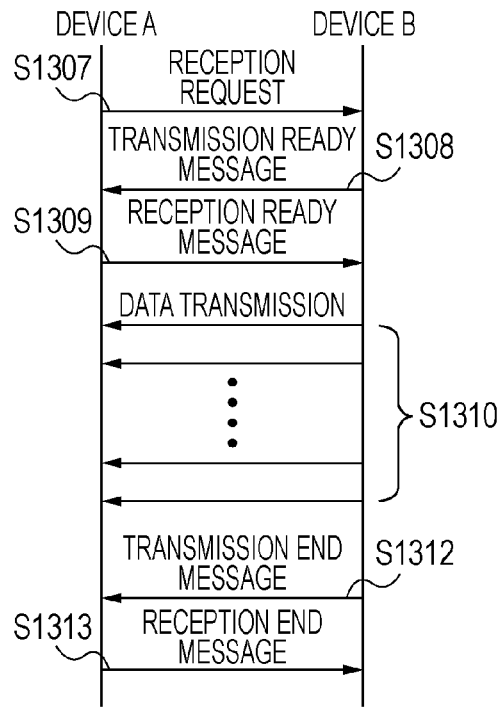

Next, referring to sequence charts shown in FIGS. 9A and 9B, a data communication process between the camera 1100 and the storage device 1109 is explained below. The communication procedures shown in FIGS. 9A and 9B can also be applied to a case where the camera 1100 and the storage device 1109 operate oppositely such that image data stored in the storage device 1109 is transmitted to the digital camera 1100. In view of the above, a general procedure of near field communication is explained below assuming that a connection request is issued by a device A, and a response to the request is returned by a device B. In FIGS. 9A and 9B, similar steps to those in FIG. 8A, 8B, or 8C are denoted by similar step numbers.

In the data transmission process shown in FIG. 9A, as in the process shown in FIG. 8B, a connection between the devices A and B is established when the devices A and B come close to each other within the communication range, and the connection is maintained until the devices A and B go away out of the communication range.

If the device A transmits a data transmission request (S1301), the device B performs a data reception preparation process and returns a reception-ready response to the device A (S1302). If the device A receives this response, the device A transmits data to the device B (S1303). If the transmission of the data is completed, the device A transmits a transmission end message to the device B (S1305). If the device B receives this message, the device B transmits a reception end message to the device A (S1306), and thus the data transmission process is completed.

FIG. 9B illustrates a procedure for a case where data is transmitted from the device B to the device A (i.e., the device A receives data A from the device B).

The device A transmits a reception request to the device B (S1307). In response to this request, the device B performs a transmission preparation process, and returns a transmission-ready message (S1308). If the device A receives this response, the device A performs a reception preparation process and returns a reception-ready message to the device B (S1309). If the device B receives the reception-ready message, the device B transmits data to the device A (S1310). If the transmission of the data is completed, the device B transmits a transmission end message (S1312). If the device A receives this message, the device A transmits a reception end message to the device B (S1313), and thus the data reception process is completed.

In the embodiment described above, when a digital camera is brought to a location close to a storage device, image data is automatically backed up using near field communication. When the image data backup process (or the image data transmission process) is performed, the storage priority information may be advantageously updated in the above-described manner.

When image data transmission is started in response to bringing the digital camera to a location close to a target device to which the data is to be transmitted, there is a possibility that the target device is in various situations. For example, the target device may be a personal computer or a storage device possessed by a user, or may be a personal computer of a friend of the user. In another situation, the target device may be a device for temporarily storing data.

In a circumstance in which image data is allowed to be transmitted to various devices, the storage priority may be determined depending on the device to which image data is transmitted so that the image data is deleted immediately after the transmission or may be kept depending on the storage priority.

More specifically, the storage priority may be controlled depending on the target device to which image data is transmitted such that the priority is reduced greatly when image data is transmitted to a PC of a user but the priority is maintained without being changed or may be reduced slightly when image data is transmitted to a storage device (such as a storage device of a friend) other than the PC of the user.

This makes it possible to minimize the risk that image data is deleted from a source device after the image data is transmitted from the source device to a target device that is not suitable for keeping the image data for a long term.

In particular, in a system in which image data is transmitted or backed up automatically, there is a possibility that a user is not aware which device the image data is transmitted to. By controlling the priority in the above-described manner, it is possible to reduce the probability that image data that should be kept is incorrectly deleted compared to a system in which image data is deleted unconditionally after the image data is backed up.

The embodiments described above may be implemented by executing a program on a computer. A medium used to supply the program to the computer such as a non-transitory computer-readable storage medium such as a CD-ROM disk on which the program is stored may be used to implement the embodiments described above. The program falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-332639 filed Dec. 25, 2007, which is hereby incorporated by reference herein in its entirety.

What is claimed is:

1. An information processing apparatus comprising:
an acquisition unit configured to acquire electronic information;
a storage unit configured to store the electronic information acquired by the acquisition unit;
a transmission unit configured to transmit the electronic information stored in the storage unit to destination outside of the information processing apparatus;
an addition unit configured to add priority, in terms of keeping the electronic information stored in the storage unit, to the electronic information stored in the storage unit;
a management unit configured to manage the priority in accordance with the transmission result of the transmission unit;
a change value determination unit configured to determine, according to a predetermined condition, an amount by which the priority is changed by the management unit, wherein the change value determination unit differentiate the change value of the priority in accordance with the destination to which the electronic information is transmitted by the transmission unit; and
a deletion determination unit configured to determine electronic information to be deleted preferentially in accordance with the priority.

2. The information processing apparatus according to claim 1, wherein the change value determination unit adjusts the amount of the change depending on whether the destination, to which the electronic information is transmitted by the transmission unit, operates as a master in the transmission.

3. The information processing apparatus according to claim 1, further comprising a transmission determination unit configured to determine electronic information to be transmitted by the transmission unit, by selecting the electronic information from the electronic information stored in the storage unit.

4. The information processing apparatus according to claim 1, wherein the management unit adjusts the timing of changing the priority depending on whether the destination, to which the electronic information is transmitted by the transmission unit, operates as a master in the transmission.

5. The information processing apparatus according to claim 1, further comprising:
   an image capturing unit, wherein the storage unit stores image files generated by the image capturing unit; and
   a deleting unit configured to delete, in a case where amount of space of the storage unit becomes smaller than a predetermined amount, an image which is determined to be deleted by the deletion determination unit.

6. The information processing apparatus according to claim 1, wherein the transmission unit is capable of automatically transmitting the electronic information upon starting of communication with an external device specified as the destination.

7. The information processing apparatus according to claim 6, wherein the communication by the transmission unit is performed by a near field communication unit.

8. A controlling method utilized in an information processing apparatus for transmitting electronic information, the method comprising:
   an acquiring step for acquiring electronic information;
   a storing step for storing the acquired electronic information in a storage unit;
   a transmitting step for transmitting the electronic information stored in the storage unit to a destination outside of the information processing apparatus;
   an adding step for adding priority, in terms of keeping the electronic information stored in the storage unit, to the electronic information stored in the storage unit;
   a managing step for managing the priority in accordance with the transmission result in the transmitting step;
   a change value determining step for determining, according to a predetermined condition, an amount by which the priority is changed by the managing step, wherein in the change value determining step, the change value of the priority in accordance with the destination to which the electronic information is transmitted in the transmitting step, is differentiated; and
   a determining step for determining electronic information to be deleted preferentially in accordance with the priority.

9. A non-transitory computer readable medium containing computer-executable instructions utilized in an information processing apparatus for transmitting electronic information, the medium comprising:
   computer-executable instructions for acquiring electronic information;
   computer-executable instructions for storing the acquired electronic information in a storage unit;
   computer-executable instructions for transmitting the electronic information stored in the storage unit to a destination outside of the information processing apparatus;
   computer-executable instructions for adding priority, in terms of keeping the electronic information stored in the storage unit, to the electronic information stored in the storage unit;
   computer-executable instructions for managing the priority in accordance with a transmission result from the transmission of the electronic information;
   computer-executable instructions for determining, according to a predetermined condition, an amount by which the priority is changed, wherein the change value of the priority in accordance with the destination to which the electronic information is transmitted, is differentiated; and
   computer-executable instructions for determining electronic information to be deleted preferentially in accordance with the priority.

* * * * *